Patented July 13, 1926.

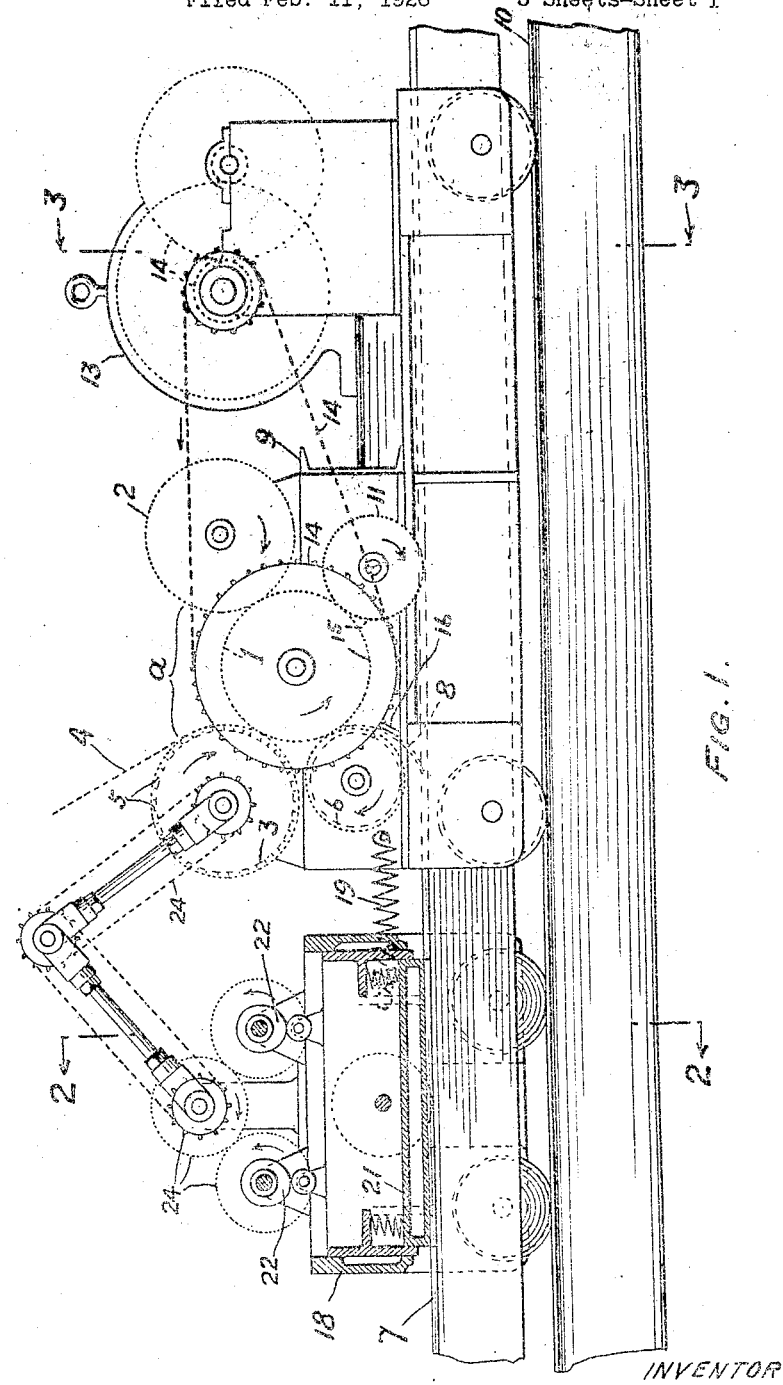

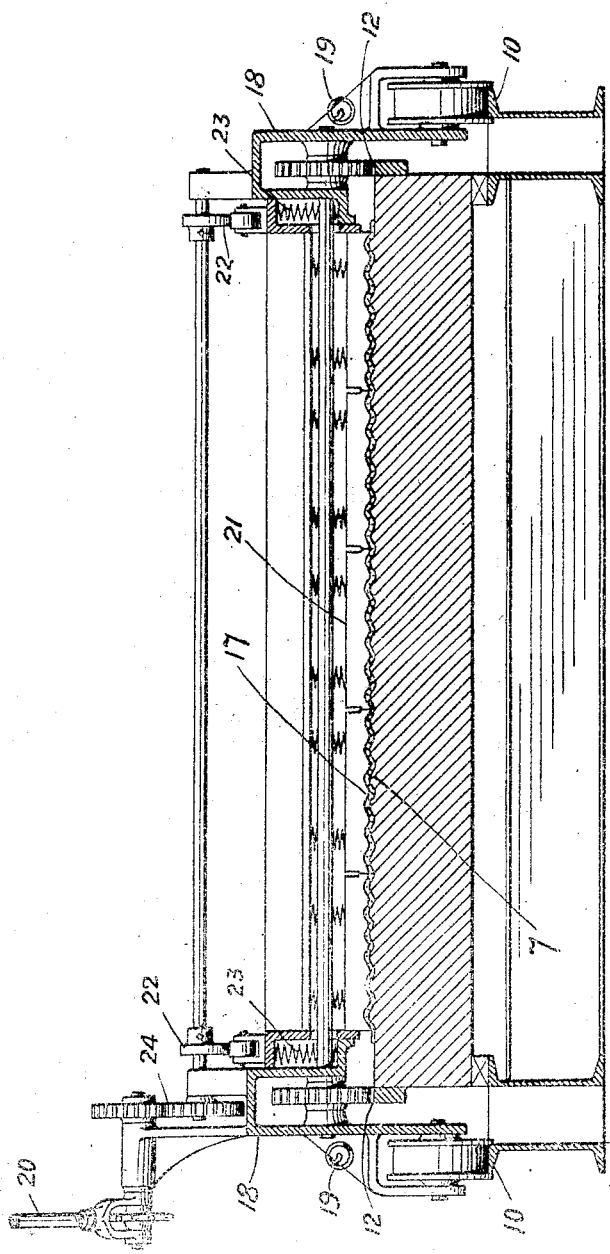

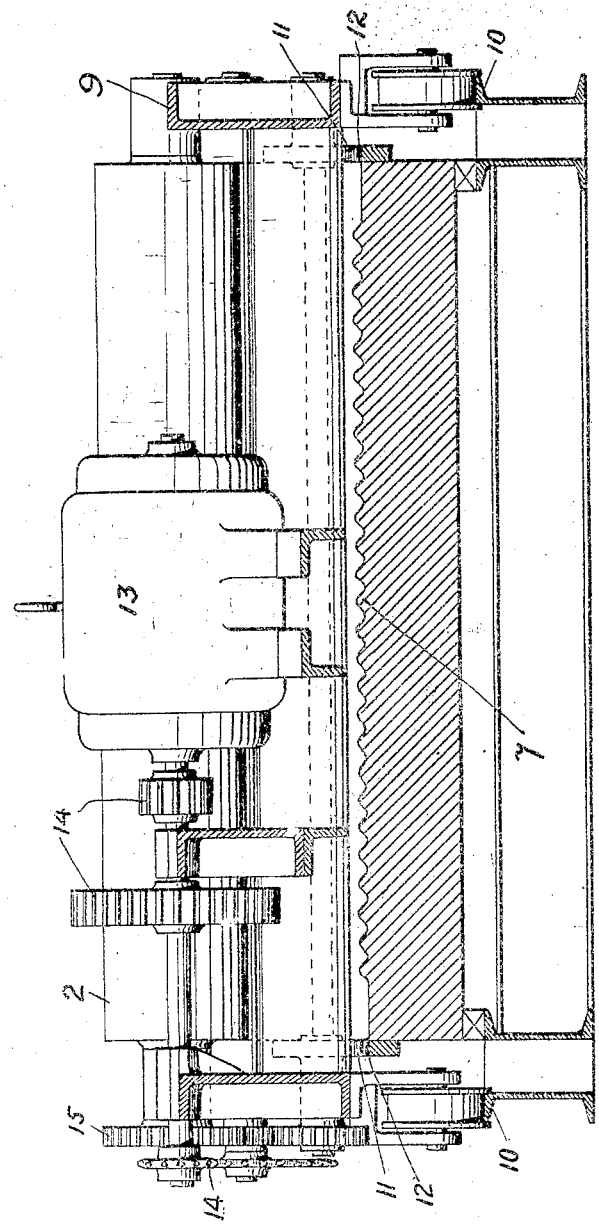

1,592,228

UNITED STATES PATENT OFFICE.

ARNO SHUMAN, OF PHILADELPHIA, PENNSYLVANIA, ASSIGNOR TO PENNSYLVANIA WIRE GLASS COMPANY, OF PHILADELPHIA, PENNSYLVANIA, A CORPORATION OF NEW JERSEY.

PROCESS FOR MAKING CORRUGATED WIRE GLASS.

Application filed February 11, 1926. Serial No. 87,480.

The principal object of the present invention is to provide for the rapid and satisfactory production of wire glass in which the wire mesh is centrally disposed and which is possessed of a good finish.

The process of the invention consists in rolling a flat sheet of glass with flat wire mesh embedded therein, and, while the interior portion of the sheet is sufficiently plastic by heat to permit twists of the mesh to stretch and while the exterior of the sheet is sufficiently solid by cooling upon bending to retain its form, simultaneously corrugating said sheet and mesh in part by laying it on a corrugated table and in part by pressing it between corrugated surfaces.

For the sake of further explanation the invention will be further described in connection with the apparatus shown in the drawings and which is well adapted for that purpose, and in the drawings.

Figure 1 is a view partly in elevation and partly in section.

Figure 2 is a section on the line 2—2 of Figure 1, and

Figure 3 is a section on the line 3—3 of Figure 1.

A pour of glass is made, as at $a$, into the space between the surfaces of the rolls 1 and 2 and the surface of the embedding roll 3 and flat wire mesh 4 is fed in at the same place. The surface of the embedding roll is provided with teeth or projections 5, which operate to push the wire mesh through one surface of the sheet of glass to the center thereof, leaving lumps of glass projecting through the openings in the wire mesh. The healing roller 6 smooths out these lumps or projections forming a flat sheet of wire glass and delivers it edgewise downwardly towards the corrugated table 7 as at 8, so that the sheet loses enough of its heat to prevent undue flow of the glass in respect to the mesh.

Relative movement is provided between the table 7 and the described apparatus for rolling the sheet of flat wire glass. As shown, the rolls 2, 3 and 6 are mounted on a wheeled carriage 9, movable on ways 10 and propelled by pinions 11 meshing with racks 12 (Fig. 3). There is a motor 13, which by gearing 14, turns the roller 1, which by gearing 15, turns the parts 2, 3, 6 and 11 in the directions indicated by the arrows.

The sheet of wire glass delivered at 8, may be directed upon the table 7, by the guide 16 carried by the carriage 9. While the interior portion of this sheet is sufficiently plastic by heat to permit the twists of the mesh to stretch and while the exterior of the sheet is sufficiently solid by cooling upon bending to retain its form, the sheet is deposited upon the corrugated surface of the table 7. Here by the gentle influence of gravity it is partially corrugated, with some loss of heat more particularly at the surface.

The corrugation of the sheet is completed and its surface is improved by pressing it between corrugated surfaces of which one is the surface of the table and of which the other is the corrugated face of the press 17, Fig. 2.

The press comprises a wheeled truck 18, movable on the ways 10 and also movable in respect to the carriage 9, with which it is connected by springs 19 and by a hinged joint 20. The corrugated face 17 of the platen 21, of the press is pressed towards the table 7 and released by means of cams 22 and springs 23 (Figs. 1 and 2). The cams are driven from the roll 3 by means of gearing 24. When the press is pressing the partially corrugated and partially cooled sheet of wire glass the truck 18 is at rest and the springs 19 are in tension and the joint 20 is expanded, and when the platen 21 is raised the truck catches up with the carriage 9 and thus the press works over the entire sheet of wire glass.

It will be obvious to those skilled in the art to which the invention relates that modifications may be made in details of procedure and hence the invention is not limited in respect to such matters or otherwise than as the prior art and the appended claims may require.

I claim:

1. The process of making wire glass which consists in rolling a plain sheet of glass with wire mesh embedded therein, and, while the interior portion of the sheet is sufficiently plastic by heat to permit twists of the mesh to stretch and while the exterior of sheet is sufficiently solid by cooling upon bending to retain its form, simultaneously corrugating said sheet and mesh in part by laying it upon a corrugated table and in part by pressing it between corrugated surfaces.

2. The process of making wire glass which consists in rolling a plain sheet of wire glass and passing the same downwardly through the air to partially cool it, laying the partially cooled sheet upon a corrugated horizontal surface and permitting it to assume a part of the final corrugated form by gravity, and to be further cooled, and pressing the partially corrugated and plastic sheet between corrugated surfaces to bring it to the final corrugated form.

ARNO SHUMAN.